US000001864H

United States Statutory Invention Registration [19]

[11] Reg. Number: H1,864

Demoret

[45] Published: Oct. 3, 2000

[54] VIBRATION DAMPING METHOD FOR CYLINDRICAL MEMBERS

[75] Inventor: Kimberly B. Demoret, Merritt Island, Fla.

[73] Assignee: The United States of America as represented by the Secretary of the Air Force, Washington, D.C.

[21] Appl. No.: 08/889,082

[22] Filed: Jul. 7, 1997

Related U.S. Application Data

[63] Continuation-in-part of application No. 08/456,970, Jun. 1, 1995, abandoned.

[51] Int. Cl.[7] ..... B23P 15/12

[52] U.S. Cl. ..... 29/897.35

[58] Field of Search ..... 29/897.35, 136, 29/141, 293; 156/187, 172, 188, 195

[56] References Cited

U.S. PATENT DOCUMENTS

| | | | |
|---|---|---|---|
| 3,296,047 | 1/1967 | Parr | 156/172 |
| 4,026,747 | 5/1977 | DeLorean et al. | 156/187 |
| 4,293,142 | 10/1981 | Davignon | 280/610 |
| 4,566,231 | 1/1986 | Konsevich | 52/145 |
| 4,676,276 | 6/1987 | Fawley | 138/172 |
| 4,860,851 | 8/1989 | Krevor et al. | 181/207 |
| 5,108,802 | 4/1992 | Sattinger | 428/34.1 |
| 5,250,132 | 10/1993 | Lapp et al. | 156/173 |
| 5,262,232 | 11/1993 | Wilfong et al. | 428/327 |
| 5,279,896 | 1/1994 | Tokunaga et al. | 428/355 |
| 5,308,675 | 5/1994 | Crane et al. | 428/120 |
| 5,335,463 | 8/1994 | Reinhall | 52/167 R |
| 5,337,288 | 8/1994 | Sorathia et al. | 367/1 |
| 5,435,867 | 7/1995 | Wolfe et al. | 156/188 |

OTHER PUBLICATIONS

*Vibration Damping*, by Nashif et al (John Wiley & Sons (1985)).

"Vibration Control with Viscoelastic Materials," by Nakra, in *Shock and Vibration Digest*, 8 (6): 3–12(1975).

"Vibration Control with Viscoelastic Materials II," by Nakra, in *Shock and Vibration Digest*, 13 (1): 17–20 (1981).

"Techniques for the Design of Highly Damped Structures," by Nelson, in *Shock and Vibration Digest*, 9 (7): 3–12 (1977).

"The Analysis and Design of Constrained Layer Damping Treatments," in *Damping Applications and Vibration Control*, P.J. Torvik Ed, New York, ASME AMD vol. 38: 85–112 (1980).

"Damping of Flexural Waves by a Constrained Viscoelastic Layer," by E. Kerwin, *Journal of the Acoustical Society of America*, 31, 952–962 (1959).

"The Effect of Cuts in Damping Tapes," by G. Parfitt, *Proceedings of the Fourth Interna–tional Congress on Acoustics*, Paper P–21 (Copenhagen, Aug. 1962).

(List continued on next page.)

*Primary Examiner*—Charles T. Jordan
*Assistant Examiner*—Meena Chelliah
*Attorney, Agent, or Firm*—Bobby D. Scearce; Thomas L. Kundert

[57] ABSTRACT

A method for vibration damping cylindrical members is described which comprises applying constrained damping treatment, in the form of narrow strips of damping tape, to the surface of the member in a helical (barberpole) configuration at a selected pitch angle to a generator line of the member, the tape being either continuous (unsegmented) or segmented at selected optimal length.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"Length Optimization for Constrained Viscoelastic Layer Damping," by R. Plunkett et al, *Journal of the Acoustical Society of America*, 48 (1): 150–161 (1970).

*Design and Analysis of Constrained Layer Damping Treatment for Bending and Torsion*, K. Balkema, PhD Dissertation, Air Force Institute of Technology, Wright Patterson AFB, OH (1995).

"The Barberpole Constrained Layer Damping for Bending and Torsion," by K. Balkema Demoret, in "Smart Structures and Materials 1995," *Passive Damping*, Proc. SPIE 2445:350–361 (1995).

VIBRATION DAMPING METHOD FOR CYLINDRICAL MEMBERS

This application is a continuation-in-part of application Ser. No. 08/456,970, filed on Jun. 1, 1995, abandoned on Jul. 7, 1997.

RIGHTS OF THE GOVERNMENT

The invention described herein may be manufactured and used by or for the Government of United States for all governmental purposes without the payment of any royalty.

BACKGROUND OF THE INVENTION

The present invention relates generally to methods for damping vibrations in beams, plate members and other structures, and more particularly to a method for vibration damping cylindrical members by applying constrained layer vibration damping treatment in a barberpole configuration.

Conventional vibration damping treatments for metal structures have included application of constraining layers in the form of damping tapes comprising viscoelastic damping material for attachment to the surface to be damped and an outer thin constraining layer in the form metal tape or foil. Damping tapes having various layers of viscoelastic damping materials and outer constraining metal layers are readily commercially available, such as SJ 2052 series of damping treatments manufactured by 3M Company or products of The Soundcoat Company or the E.A.R. Company. Other materials and treatment methods used in vibration damping are discussed in *Vibration Damping,* by Nashif et al (John Wiley & Sons (1985)). Other references describing use of damping materials for inhibiting structural vibration include Nakra, "Vibration Control with Viscoelastic Materials," in *Shock and Vibration Digest,* 8 (6):3–12 (1975); Nakra, "Vibration Control with Viscoelastic Materials II," in *Shock and Vibration Digest,* 13(1):17–20 (1981); Nelson, "Techniques for the Design of Highly Damped Structures," in *Shock and Vibration Digest,* 9(7):3–12 (1977); and U.S. Pat. No. 5,279,896 to Tokunaga et al, U.S. Pat. No. 4,860,851 to Krevor et al, and U.S. Pat. No. 5,335,463 to Reinhall.

Conventional damping treatments for beams include attachment of narrow strips of damping tape to the beam surface parallel to the beam axis, and may also include segmentation of the damping strips to optimal length in consideration of the bending wavelength(s) to which the beam is subjected. Theoretical discussions and experimental data on prior art constrained layer damping treatment as applied to metal structures are presented in an overview, "The Analysis and Design of Constrained Layer Damping Treatments," in *Damping Applications and Vibration Control,* P. J. Torvik Ed, New York, ASME AMD 38:85–112 (1980); in E. Kerwin, "Damping of Flexural Waves by a Constrained Viscoelastic Layer," *Journal of the Acoustical Society of America,* 31:952–962 (1959); in G. Parfitt, "The Effect of Cuts in Damping Tapes," *Proceedings of the Fourth International Congress on Acoustics,* Paper P-21 (Copenhagen, Aug. 1962); and in R. Plunkett et al, "Length Optimization for Constrained Viscoelastic Layer Damping," *Journal of the Acoustical Society of America,* 48(1):150–161 (1970). Conventional damping treatments for beams taught in the prior art, however, provide negligible damping for torsional vibration, have disadvantages as applied to beams subjected to pure bending, present certain maintenance problems if the applied damping treatment is segmented and exhibit out-gassing of the viscoelastic material which may be unacceptable for application in certain extreme (e.g., space) environments.

The invention solves or substantially reduces in critical importance problems with prior art damping treatments as applied to cylindrical members by providing a damping treatment method in which a constrained layer in the form of narrow strips of damping tape is applied to the surface of the member in a helical configuration (i.e., resembling a barberpole), at a selected pitch angle in the helix, and in unsegmented or segmented arrangements. In a segmented arrangement, the tape is cut around the circumference of the cylindrical surface at selected segment lengths, and results in substantially improved damping of combined bending and torsional vibration over that provided by conventional treatments. For cylindrical members subjected to pure bending, a virtual segmentation effect defined herein is provided by the unsegmented arrangement and provides better damping than unsegmented strips placed parallel to the cylindrical axis in accordance with conventional treatment. The unsegmented arrangement is highly effective in damping combined bending and torsion by applying alternate strips of selectively different thicknesses and/or material properties. The unsegmented barberpole may be preferred for cylindrical members subjected to bending and/or torsion under extreme (e.g., high load, corrosive, vacuum, hot or cold) environments, when segmented treatment is difficult to apply or where there are maintenance or operational reasons to avoid segmentation.

It is therefore a principal object of the invention to provide an improved vibration damping method.

It is a further object of the invention to provide a constrained layer vibration damping method for cylindrical members.

It is yet another object of the invention to provide a method for vibration damping a cylindrical member by applying damping treatment in the form of a viscoelastic damping layer and metallic constraining layer, such as damping tape, in a helical configuration along the member surface.

These and other objects of the invention will become apparent as a detailed description of representative embodiments thereof proceeds.

SUMMARY OF THE INVENTION

In accordance with the foregoing principles and objects of the invention, a method for vibration damping cylindrical members is described which comprises applying constrained damping treatment, in the form of narrow strips of damping tape, to the surface of the member in a helical (barberpole) configuration at a selected pitch angle to a generator line of the member, the tape being either continuous (unsegmented) or segmented at selected optimal length.

DESCRIPTION OF THE DRAWINGS

The invention will be more clearly understood from the following detailed description of representative embodiments thereof read in conjunction with the accompanying drawings wherein.

DETAILED DESCRIPTION

A complete theoretical discussion and experimental data on constrained layer vibration damping treatment of cylindrical members according to the invention are presented in K. Balkema, *Design and Analysis of Constrained Layer Damping Treatment for Bending and Torsion,* PhD Dissertation, Air Force Institute of Technology, Wright Patterson AFB, Ohio (1995) DTIC ADA-284-799, and K. Balkema Demoret, "The Barberpole Constrained Layer Damping for Bending and Torsion," in Smart Structures and Materials 1995, *Passive Damping,* Proc SPIE 2445: 350–361 (1995).

Figure 1:
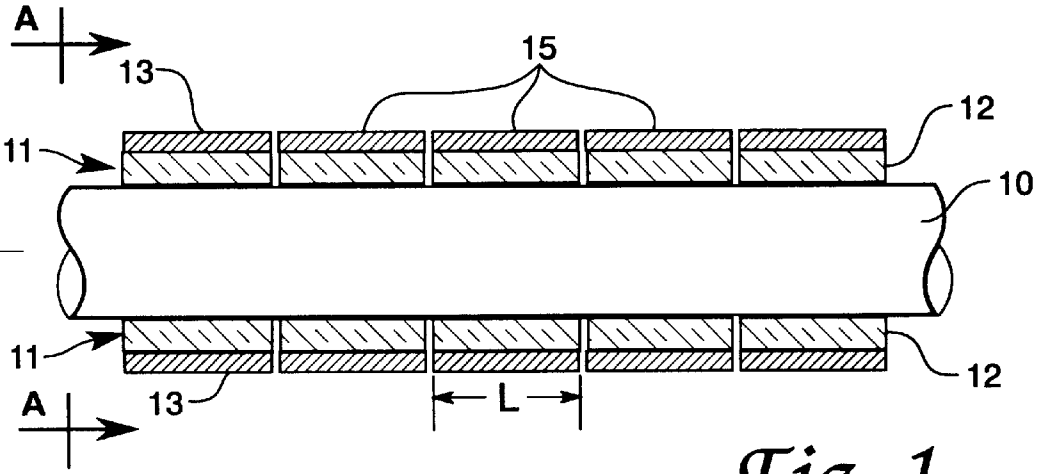
Fig. 1 PRIOR ART
FIG. 1 shows an axial sectional view of a member having conventional constrained layer damping treatment applied thereto.
Figure 1A:
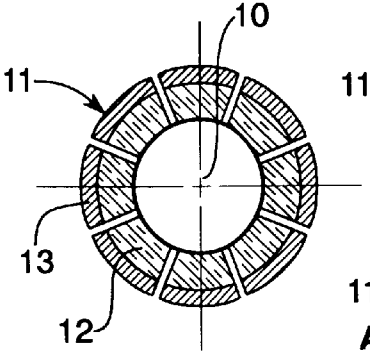
Fig. 1a PRIOR ART
FIG 1*a* is a view of the FIG. 1 member taken along line A—A.

Referring now to the drawings, FIG. 1 shows in section a member having conventional constrained layer damping treatment applied thereto such as after Plunkett et al, supra. FIG. 1*a* is a view of the FIG. 1 member taken along line A—A thereof. A basic structure such as beam 10, has applied to the surface thereof one or more constraining layers 11 such as in the form of damping tape cut at regular intervals into segments 15. Layer 11 may typically comprise thin (2 to 10 mm) viscoelastic layer 12 of ISD 110, ISD 112, ISD 113 (3M Company), or other suitable damping material (see e.g., Tokunega et al and Reinhall, supra, and "Scotchdamp Vibration Control Systems: Product Information and Performance Data," 3M Company, St. Paul Minn.), and a thin (5 to 20 mm) layer 13 of aluminum, steel, graphite epoxy or other suitable stiff material. Commercially available damping materials are usually supplied in sheet form consisting of a viscoelastic layer covered by a metallic sheet or foil. The sheet is then cut into strips of preselected width for application as a damping tape. Segment 15 length L is selected depending on the material selection for viscoelastic layer 12 and layer 13 and the temperature of operation, after the analysis presented by Plunkett et al.

Figure 2:
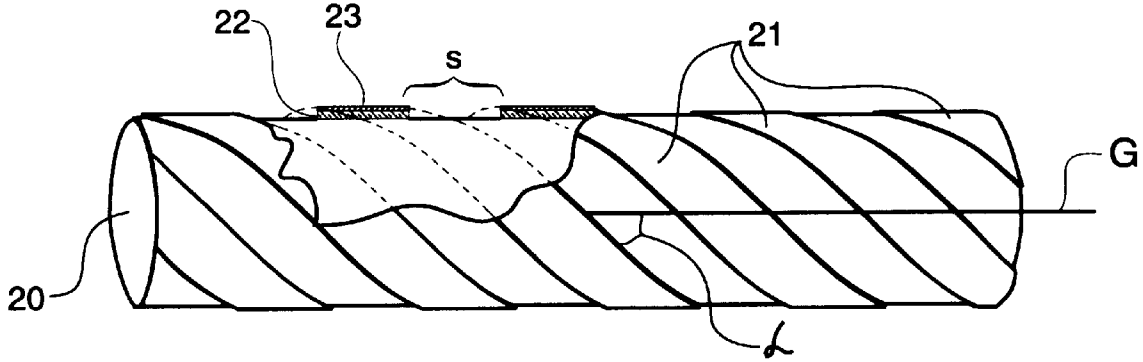
FIG. 2 shows in partial axial section a cylindrical member having constrained layer damping treatment applied thereto according to the invention.

FIG. 2 shows in partial axial section cylindrical member 20 having constrained layer damping treatment applied according to the invention. It may be noted at the outset that the invention may be applied to beams of near circular oval cross section as well as cylindrical beams. In accordance with a governing principle of the invention, narrow strips 21 of damping treatment are applied to the surface of member 20 in a helical barberpole configuration with preselected axial spacing s between adjacent helical turns of strips 21 as depicted most clearly in FIG. 2. Strips 21 are placed on the surface of member 20 at preselected pitch angle $\alpha$ with respect to a generator line G for the cylindrical surface of member 20 to define the desired helical configuration. As with conventional damping treatments discussed above, strips 21 may comprise layer 22 of any suitable conventional viscoelastic material enumerated above and constraining (metallic) layer 23 of any suitable material also enumerated above. Commercially available damping tape of the SJ 2052 type including aluminum foil (2 mm thick) on ISD 112 viscoelastic material (5 mm thick) (3M Company) was used in damping a 7.6 cm diameter by 183 cm long solid cylindrical beam solidly anchored and insulated from external vibration in demonstration of the method of the invention. (See K. Balkema, Dissertation, supra, pages 8-1 to 8-23.)

The analysis presented in the Demoret references, supra, confirmed that for members (beams) subjected to pure bending, narrow strips (having width about 0.01 to 0.09 times the circumference of the member) applied to the surface of the member along one or more generator lines for the member are effective. However, for a member subjected to torsion or a combination of torsion and bending, the strips so applied along a generator line are not effective in resisting the shear that the surface of the member experiences in torsion. Strips applied at a pitch angle $\alpha=\pi/4$ relative to the generator lines of the member provide maximum resistance to torsion. For a member subjected to combined torsion and bending application of damping strips in the helical arrangement according to the invention at angle $\alpha$ according to these teachings, with the constraining layer 23 cut to an optimal length of about 4.7 inches substantially as that defined by Plunckett et al, supra, was shown to be effective. The optimal pitch angle for a combination of bending and torsion depends on the relative loads and frequencies applied in bending and/or torsion, but lies generally in the range for $\alpha$ of about $\pi/16$ to $\pi/4$ radians.

An unexpected beneficial attribute of applying unsegmented damping treatment strips (i.e., continuous strips 21 (FIG. 2)) in the helical configuration according to the invention is that a virtual segmentation effect is exhibited by strips 21, in the absence of physical cuts in constraining layer 23, for member 20 subjected to pure bending. Virtual segmentation results because extensional stress in an unsegmented constraining layer 23 equals zero at each crossing of the neutral plane (i.e., the plane containing the axis of member 20 and coincident with the plane of bending). Additional damping is obtained without actual segmentation of the constraining layer. The length $L_v$ of the virtual segment depends only on the radius R of member 20 and the selected pitch angle $\alpha$, and is defined by the strip length that lies between two adjacent crossings of the neutral plane, viz., $L_v=\pi R/\sin\alpha$. For a member subjected to substantially pure bending, using unsegmented damping treatments, effectiveness of the treatment will be optimum at a virtual segment length substantially equal to the optimal length suggested by K. Balkema (supra, page 7.44), and exhibits improved damping over unsegmented strips applied along a generator line of member 20 (after Plunket et al, supra). No virtual segmentation effect is exhibited for unsegmented strips on member 20 subjected to torsion, and, accordingly, for members subjected to torsion or to combined torsion and bending, strips 21 must be segmented, and the damping treatment is again optimum at a segment length of about the optimal length defined above. If damping of both bending and torsion using the unsegmented configuration is desired, then alternate helical strips of damping tape having different viscoelastic material thicknesses and/or material properties may be used.

Figure 3:
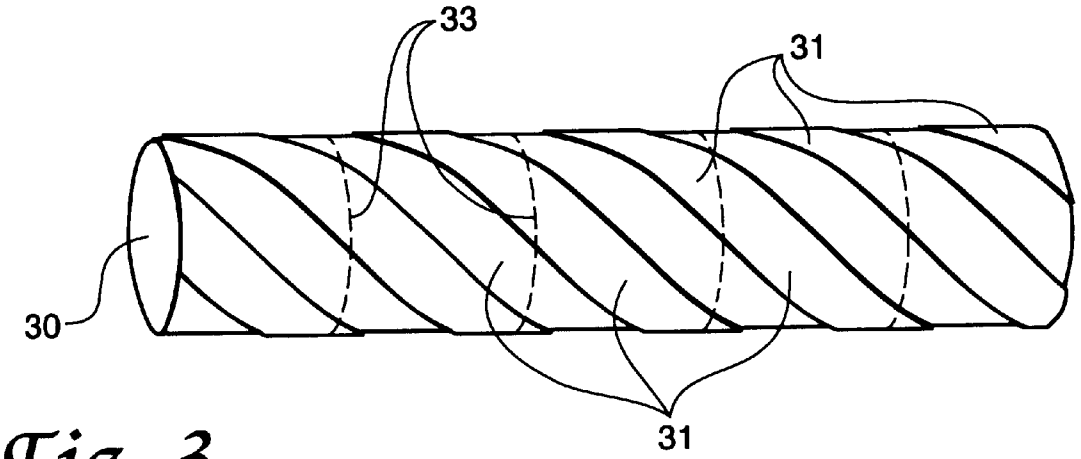
FIG. 3 shows in elevation a cylindrical beam having segmented constrained layer treatment applied in a barberpole configuration according to the invention.
Figure 4:
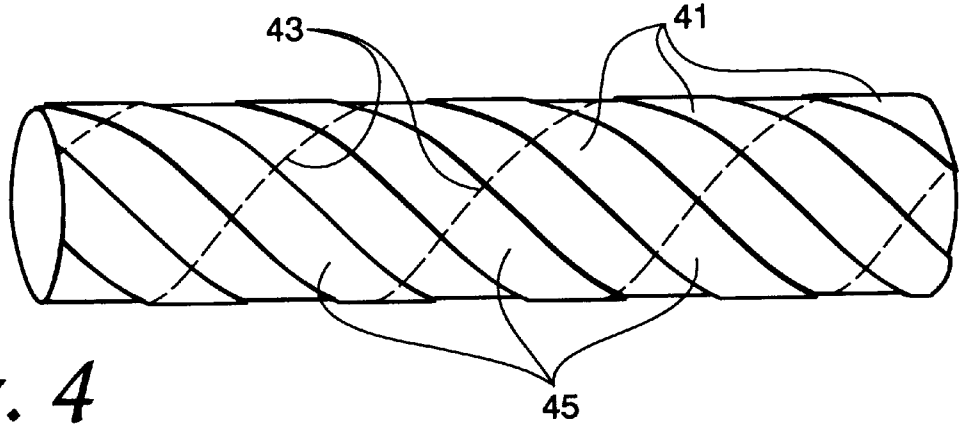
FIG. 4 shows in elevation a cylindrical beam having an alternative segmented constrained layer treatment according to the invention in the form of spiral cuts defining the segments.

FIG. 3 shows in partial axial section a cylindrical beam 30 having segmented constrained layer treatment applied in a barberpole configuration according to the invention, and comprises a plurality of strips 31 applied in a helical arrangement substantially the same as the unsegmented treatment described in relation to FIG. 2 above, which are then segmented by cutting through the constraining layer(s) in a plurality of regular, axially spaced, circumferential cuts 33 to define the trapezoidally shaped segments 35 of selected optimal length. Alternatively, and with reference now to FIG. 4, segmentation of the strips (viz., strips 21 of FIG. 2) may be effected by making one or more spiral cuts 43 in the constraining layer(s) to define segments 45 of selected optimal length.

The foregoing discussion teaches that damping both bending and torsional vibration is obtained using segmented damping strips having substantially uniform physical properties and cross-sectional dimensions. Constituent materials for the damping treatment and optimal length for the segmented strips are selected in consideration of the frequency of vibration to be experienced by the member to which the treatment is applied, because of the frequency dependence of the viscoelastic material. It is noted, however, that, within the contemplation of the teachings hereof, strips of different widths, thicknesses and compositions may be applied to a member at various optimal lengths and pitch angles in a single damping treatment in order to accommodate a broad range of applied bending and torsion frequencies and environmental conditions (temperature, pressure, etc). Additionally, damping treatment comprising strips having more than one layer of viscoelastic materials each having characteristic thicknesses and/or elastic properties for accommodating a range of damping frequencies may be used as would occur to the skilled artisan practicing the invention.

The entire teachings of all references cited herein are incorporated herein by reference.

The invention therefore provides a method for vibration damping in cylindrical members. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for vibration damping a substantially cylindrically shaped member, comprising the steps of:

(a) providing narrow strips of damping treatment, said damping treatment comprising a first layer of viscoelastic material overlaid with a second stiff constraining layer; and (b) applying said strips to the surface of a member in a helical configuration with preselected axial spacing between adjacent helical turns of said helical configuration and at a selected non-zero pitch angle with respect to a generator line of said member.

2. The method of claim 1 further comprising the step of cutting said constraining layer of said strips to preselected length.

3. The method of claim 2 wherein said constraining layer is cut circumferentially of said member.

4. The method of claim 2 wherein said constraining layer is cut spirally of said member.

5. The method of claim 1 wherein said strips have width in the range of 0.1 to 0.9 times the circumference of said member.

6. The method of claim 1 wherein said angle is in the range of about $\pi/16$ to $\pi/4$ radians.

7. The method of claim 1 wherein said constraining layer comprises aluminum, steel or graphite epoxy.

* * * * *